(12) United States Patent
Wlodarczyk et al.

(10) Patent No.: US 10,787,902 B2
(45) Date of Patent: Sep. 29, 2020

(54) METHOD AND SYSTEM FOR CORRECTING A CAPILLARY PRESSURE CURVE

(71) Applicant: Schlumberger Technology Corporation, Sugar Land, TX (US)

(72) Inventors: Sylvain Wlodarczyk, Saint Clement de Riviere (FR); Keith Pinto, Houston, TX (US); Olivier Marché, Grabels (FR); Akshat Gupta, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 275 days.

(21) Appl. No.: 15/577,326

(22) PCT Filed: May 31, 2016

(86) PCT No.: PCT/US2016/034939
§ 371 (c)(1),
(2) Date: Nov. 27, 2017

(87) PCT Pub. No.: WO2016/196421
PCT Pub. Date: Dec. 8, 2016

(65) Prior Publication Data
US 2018/0163533 A1 Jun. 14, 2018

(30) Foreign Application Priority Data
Jun. 1, 2015 (FR) ..................... 15 54944

(51) Int. Cl.
*E21B 49/00* (2006.01)
*G01V 1/40* (2006.01)
(Continued)

(52) U.S. Cl.
CPC ............ *E21B 49/008* (2013.01); *E21B 47/06* (2013.01); *E21B 49/00* (2013.01); *G01V 1/40* (2013.01); *G01V 99/00* (2013.01)

(58) Field of Classification Search
CPC ........ E21B 47/06; E21B 49/00; E21B 49/008; G01V 1/40; G01V 99/00; G01V 9/02; (Continued)

(56) References Cited

U.S. PATENT DOCUMENTS

| 4,211,106 A | 7/1980 | Swanson |
| 5,828,981 A | 10/1998 | Callender et al. |

(Continued)

FOREIGN PATENT DOCUMENTS

| WO | 1998/40763 A1 | 9/1998 |
| WO | 2007/076044 A2 | 7/2007 |

(Continued)

OTHER PUBLICATIONS

International Preliminary Report on Patentability for the cross referenced International patent application PCT/US2016/026311 dated Oct. 19, 2017.

(Continued)

*Primary Examiner* — Elias Desta

(57) ABSTRACT

A system and method for correcting capillary pressure curves includes creating a capillary pressure curve using multiple linked hyperbolic tangents, determining a closure correction pressure cutoff of the capillary pressure curve, and correcting the capillary pressure curve. The correction may include normalizing the capillary pressure curve and extrapolating the capillary pressure curve.

19 Claims, 16 Drawing Sheets

(51) Int. Cl.
*G01V 99/00* (2009.01)
*E21B 47/06* (2012.01)
(58) Field of Classification Search
CPC .. G01N 15/082; G01N 33/241; Y02A 90/344; Y10S 706/928; Y10S 706/929
See application file for complete search history.

(56) References Cited

U.S. PATENT DOCUMENTS

| | | | |
|---|---|---|---|
| 7,216,533 B2* | 5/2007 | McGregor | E21B 33/1216 |
| | | | 73/152.27 |
| 8,365,831 B2* | 2/2013 | Kim | E21B 43/00 |
| | | | 166/369 |
| 8,645,070 B2* | 2/2014 | Hanson | E21B 49/00 |
| | | | 324/303 |
| 9,792,258 B2 | 10/2017 | Buiting et al. | |
| 2006/0047432 A1 | 3/2006 | Egermann et al. | |
| 2014/0257702 A1 | 9/2014 | Al-Ibrahim et al. | |
| 2014/0350860 A1 | 11/2014 | Mezghani et al. | |
| 2018/0119524 A1 | 5/2018 | Wlodarczyk et al. | |

FOREIGN PATENT DOCUMENTS

| | | |
|---|---|---|
| WO | 2012/037317 A2 | 3/2012 |
| WO | 2014/143166 A1 | 9/2014 |
| WO | 2015/021088 A1 | 2/2015 |

OTHER PUBLICATIONS

International Preliminary Report on Patentability for the equivalent International patent application PCT/US2016/034939 dated Dec. 14, 2017.
Lian, et al., "Saturation modeling in a carbonate reservoir using capillary pressure based saturation height function: a case study of the Svk reservoir in the Y Filed," Journal of Petroleum Exploration and Production Technology, vol. 6, No. 1, Mar. 18, 2015, pp. 73-84.
Francesconi, et al., "Reservoir Rock Types Application—Kashagan," SPE/EEAGE Reservoir Characterization and Simulation Conference, Oct. 19-21, 2009, Abu Dhabi, UAE, Society of Petroleum Engineers, US, Engineering Information, Inc., New York, NY, US, vol. SPE-125342, pp. 1-17.
Search Report for the equivalent French patent application 1554944 dated May 2, 2016.
3rown, "Capillary Pressure Investigations," Society of Petroleum Engineers, vol. 192, 1951, pp. 67-74.
Leverett, "Capillary Behavior in Porous Solids," 941152-G SPE Journal Paper—1941, pp. 152-169.
Roper, "The Hyperbolic Tangent World," retrieved at http://www.roperld.com/science/Mathematics/HyperbolicTangentWorld.htm on Sep. 29, 2017.
Swanson, "A Simple Correlation Between Permeabilities and Mercury Capillary Pressures," Society of Petroleum Engineers of AIME, Journal of Petroleum Technology, pp. 2498-2504.
International Search Report and Written Opinion for the equivalent International Patent application PCT/US2016/034939 dated Sep. 21, 2016.
International Search Report and Written Opinion for the cross referenced International Patent application PCT/US2016/026311 dated Jul. 28, 2016.
Harrison, et al., "Saturation Height Methods and Their Impact on Volumetric Hydrocarbon in Place Estimates," SPE Annual Technical Conference and Exhibition, Jan. 1, 2001.
Pittman, "Estimating Pore Throat Size in Sandstones from Routine Core-Analysis Data; Edward D. Pittman," Jan. 1, 2014.
Extended Search Report for the equivalent European patent application 16777232.6 dated Dec. 6, 2018.
Extended Search Report for the cross referenced European patent application 16804196.0 dated Feb. 18, 2019.
Skalinski, et al. "Defining and Predicting Rock Types in Carbonates—Preliminary Results form and Integrated Approach using Core and Log Data from the Tengiz Field," Petrophysics, vol. 47, No. 1, Feb. 2006, pp. 37-52.
Office Action for U.S. Appl. No. 15/564,732 dated Feb. 24, 2020.

* cited by examiner

US 10,787,902 B2

METHOD AND SYSTEM FOR CORRECTING A CAPILLARY PRESSURE CURVE

CROSS-REFERENCE TO RELATED APPLICATION

The present document is based on and claims priority to France Non-Provisional Application Serial No.: 15/54944, filed Jun. 1, 2015, which is incorporated herein by reference in its entirety.

BACKGROUND

In order to create accurate oilfield reservoir models, a saturation of water and hydrocarbon may be predicted at a given point in the oilfield reservoir.

Saturation data may be available at the well scale, where it can be accurately derived from petrophysical well log data using various industry workflows and standards. However, it may be desirable to calculate saturation at the reservoir scale, where few reservoir properties are known. In such cases, a saturation model may be obtained using a saturation height function. However, saturation models may rely on saturation height functions for single pore throat systems, or if multiple pore throats modeling is possible, on unstable models that are dependent on the number of data points used and the selection of the best fit intervals.

SUMMARY

Embodiments of the disclosure may provide a computing system, non-transitory computer-readable medium, and method for correcting a capillary pressure curve. For example, the method includes creating a capillary pressure curve using multiple linked hyperbolic tangents, and determining a closure correction pressure cutoff of the capillary pressure curve. The method may further include correcting the capillary pressure curve, where the correcting of the capillary pressure curve includes normalizing the capillary pressure curve or extrapolating the capillary pressure curve.

In another embodiment, the method may further include determining an entry pressure for the capillary pressure curve after correcting the capillary pressure curve.

In another embodiment, the determining of the closure correction pressure cutoff of the capillary pressure curve includes determining a local minimum of the second derivative of the capillary pressure curve, and the closure correction pressure cutoff corresponds to the local minima where the capillary pressure is the lowest.

In another embodiment, the normalizing of the capillary pressure curve includes adjusting the closure correction pressure cutoff to correspond to a wetting phase saturation of 100%, and the entry pressure corresponds to the closure correction pressure cutoff after adjusting the closure correction pressure cutoff.

In another embodiment, the extrapolating of the capillary pressure curve includes determining a first derivative pressure cutoff, performing regression analysis between the first derivative pressure cutoff and the closure correction pressure cutoff, and extrapolating the capillary pressure curve to the 100% wetting phase saturation point, wherein the first derivative pressure cutoff corresponds to the first derivative local minima where the capillary pressure is the lowest, and wherein the entry pressure corresponds to a pressure at the 100% wetting phase saturation point.

In another embodiment, the correcting of the capillary pressure curve includes cropping the capillary pressure curve to eliminate the capillary pressure data below the closure correction pressure cutoff.

In another embodiment, the capillary pressure curve is defined by the following equation:

$$f(P, a_n, w_n, t_n) = a_1 + a_N + \Sigma_{n=1}^{N}(a_{n+1} - a_n) \cdot \tan h(w_n \cdot (P - t_n))$$

with constraints:
$w_n > 0$, $\forall n \in [1, N]$ n, $N \in \mathbb{N}$
$a_{n+1} < a_n$, $\forall n \in [1, N-1]$ n, $N \in \mathbb{N}$
where P represents a logarithmic transform of a normalized capillary pressure and N represents the number of hyperbolic tangents.

In another embodiment, the non-transitory computer-readable medium stores instructions that, when executed by one or more processors of a computing system, cause the computing system to perform operations. For example, the operations may include creating a capillary pressure curve using multiple linked hyperbolic tangents, and determining a closure correction pressure cutoff of the capillary pressure curve. The operations may further include correcting the capillary pressure curve, and determining an entry pressure for the capillary pressure curve after correcting the capillary pressure curve, where the correcting of the capillary pressure curve includes normalizing the capillary pressure curve or extrapolating the capillary pressure curve.

In another embodiment, the computing system may include one or more processors, and a memory system including one or more non-transitory computer-readable media storing instructions that, when executed by one or more processors of a computing system, cause the computing system to perform operations. For example, the operations may include creating a capillary pressure curve using multiple linked hyperbolic tangents, and determining a closure correction pressure cutoff of the capillary pressure curve. The operations may further include correcting the capillary pressure curve, and determining an entry pressure for the capillary pressure curve after correcting the capillary pressure curve, where the correcting of the capillary pressure curve includes normalizing the capillary pressure curve or extrapolating the capillary pressure curve.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

Figure 1:
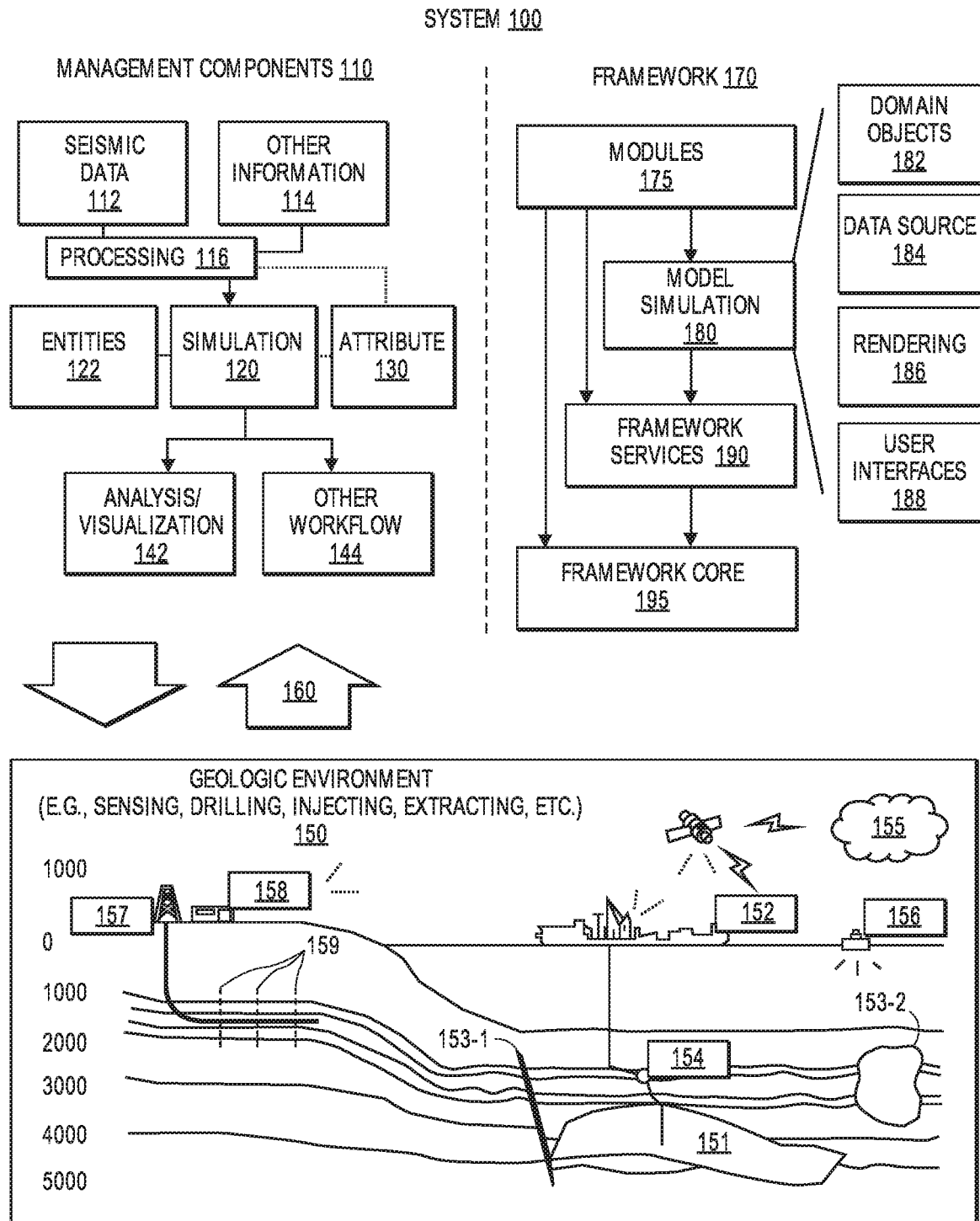
FIG. 1 illustrates an example of a system that includes various management components to manage various aspects of a geologic environment according to an embodiment.

It should be noted that some details of the drawings have been simplified and are drawn to facilitate understanding of the present teachings rather than to maintain strict structural accuracy, detail, and scale. These drawings/figures are intended to be explanatory and not restrictive.

DETAILED DESCRIPTION

Reference will now be made in detail to the various embodiments in the present disclosure, examples of which are illustrated in the accompanying drawings and figures. The embodiments are described below to provide a more complete understanding of the components, processes and apparatuses disclosed herein. Any examples given are intended to be illustrative, and not restrictive. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on."

It will also be understood that, although the terms first, second, etc. may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

When referring to any numerical range of values herein, such ranges are understood to include each and every number and/or fraction between the stated range minimum and maximum. For example, a range of 0.5-6% would expressly include intermediate values of 0.6%, 0.7%, and 0.9%, up to and including 5.95%, 5.97%, and 5.99%. The same applies to each other numerical property and/or elemental range set forth herein, unless the context clearly dictates otherwise.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122.

Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As described above, the system 100 may be used to simulate or model a geologic environment 150 and/or a reservoir 151. Reservoir models often rely on saturation data as a component. In some embodiments, the system 100 may rely on a saturation model as a component of the reservoir 151 model.

Figure 2:
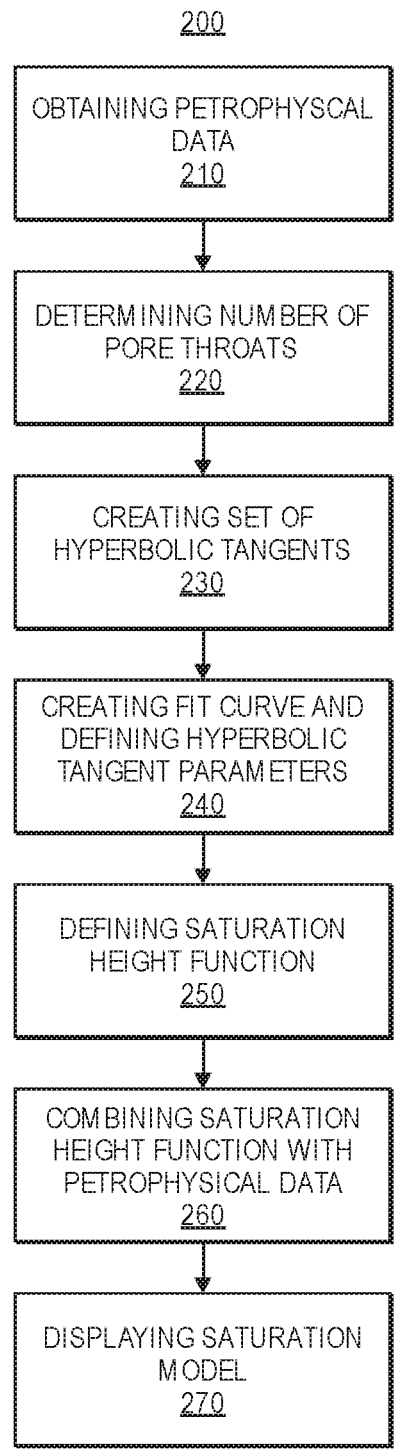
FIG. 2 illustrates a flowchart of a method for modeling saturation in a reservoir according to an embodiment.

FIG. 2 illustrates a flowchart of a method 200 for modeling saturation in a reservoir, according to an embodiment. As illustrated in FIG. 2, the method 200 may begin with obtaining petrophysical data in operation 210. For example, in operation 210, petrophysical data from the reservoir may be collected or received. The petrophysical data may include capillary pressure data and permeability data. In some embodiments, the petrophysical data may also include porosity, height above free water level, and rock type data.

In operation 220, a number of pore throats may be determined from the obtained petrophysical data. For example, a number of pore throats may be determined from the obtained capillary pressure data. In other embodiments, the number of pore throats in the system may be predetermined.

After the number of pore throats is set, a set of hyperbolic tangents equal in number to the number of pore throats may be set in operation 230.

In operation 240, the set of hyperbolic tangents may be used to create a curve to fit the obtained petrophysical data and to define a set of hyperbolic tangent parameters. For example, the set of hyperbolic tangents may be used to create a curve to fit the obtained capillary pressure data and define a set of hyperbolic tangent parameters associated with said curve.

In some embodiments, the curve created to fit the capillary pressure data may be corrected to account for the manner in which the capillary pressure data was obtained. For example, the curve may be corrected for conformance or closure effects. The method 200 may automatically perform closure correction on the set of hyperbolic tangents used to create a curve to fit the obtained capillary pressure data, and may also determine the entry pressure corresponding to the capillary pressure curve.

After the hyperbolic tangent parameters are defined, at least one hyperbolic tangent parameter may be combined with the obtained petrophysical data to define dependencies for a saturation height function in operation 250. For example, at least one hyperbolic tangent parameter may be combined with the obtained permeability data to define a permeability dependency for some of the parameters defining a saturation height function.

In operation 260, the saturation height function may be combined with petrophysical data to model saturation in the reservoir. For example, saturation of water and hydrocarbon in a reservoir can be computed from the saturation height function using permeability data, porosity data, and a height above free water level. In some embodiments, the saturation height function may also be combined with rock type data. For example, the saturation height function may be limited to a single rock type or a single rock type may be assumed for the reservoir model.

In operation 270, the saturation model may be displayed. For example, in operation 270, the saturation model or changes to the saturation model may be displayed. In other embodiments, the saturation model may be displayed as part of the larger reservoir model.

As described above, a saturation data model may be used to predict a saturation of water and hydrocarbon at a given point in an oilfield reservoir. For example, a saturation data model can be created using reservoir properties such as permeability, porosity, height above free water level, and a saturation height function. In some embodiments, porosity, permeability, and rock type data may be obtained from seismic data and/or well data. Similarly, the saturation height function may be a function of the capillary pressure, water saturation, and permeability data. In some embodiments, the petrophysical data for these oilfield properties is obtained from the analysis of core plug samples representative of the oilfield reservoir.

As the term is used herein, "capillary pressure" refers to the difference in capillary forces created by two or more immiscible fluids within voids of a rock. The capillary pressure data may be measured via experimentation or may be received into the model. For example, capillary pressure may be measured via porous plate, centrifuge, or mercury injection experiments. Capillary pressure data may include measurement of saturation at different level of pressure and/or height. In some embodiments, a record of laboratory capillary pressure data vs. wetting phase saturation or non-wetting phase saturation is obtained and is used to build the saturation height function. In another embodiment, the capillary pressure data obtained through experimentation is normalized before the capillary pressure data is used to build the saturation height function. Normalization may allow use of the saturation height function with reservoir with various fluid systems, such as gas/water, oil/water, and oil/water/gas. In one embodiment, the measured capillary pressure data is representative of the oilfield reservoir capillary pressure or a portion thereof. For example, a capillary pressure data in terms of height may represent a maximum thickness of the reservoir to be modeled.

As the term is used herein, "water saturation" refers to a portion of a substrate's porosity filled with water. In one embodiment, water saturation data may be obtained through experimentation. For example, water saturation may be obtained from the capillary pressure experiments: non-wetting phase saturation (in case of mercury injection) may be computed as the volume occupied by the non wetting phase (measure as the injected volume during the experiment) over the total volume of pores. In some embodiments, the water saturation data is normalized. In one embodiment, the measured water saturation data is representative of the oilfield reservoir water saturation or a portion thereof.

As used herein, "permeability" refers to the ability of a substrate to transmit a fluid. In one embodiment, permeability data may be obtained through experimentation. For example, permeability data may be derived from pressures measured before entering a substrate sample and after exiting the substrate using a fluid of known viscosity. In the case of gas, corrections, such as correction for the Klinkenberg effect, may be included. In one embodiment, the measured permeability data is representative of the oilfield reservoir permeability or a portion thereof.

In one embodiment, the saturation height function relies on two equations to fit capillary pressure data measured from the reservoir: a first equation solving for a set of unknown parameters using measured capillary pressure data, and a second equation using the solved unknown parameters to apply a set of hyperbolic tangents to fit capillary pressure data obtained from a single or multi-pore throat system. In one embodiment, these equations fits capillary pressure data measured from the reservoir using a constrained non-linear least-square process. In another embodiment, these equations fits capillary pressure and saturation data measured from the reservoir using a constrained non-linear least-square process.

For example, a first equation (Equation 1) may use a set M of measured water saturation and capillary pressure data. In one embodiment, the water saturation and capillary pressure data is obtained through analysis and experimentation based on core plug samples from the reservoir. In another embodiment, the water saturation and capillary pressure data are normalized, and the normalized capillary pressure is transformed to the logarithm of the capillary pressure before incorporation into Equation 1.

In one embodiment, Equation 1 uses the set M of measured water saturation and capillary pressure data in a non-linear least square method to find unknown parameters $(a_n, w_n, t_n)$ of a model that minimizes an error E between the data and a capillary pressure model f. In one embodiment, the first equation corresponds to the following equation:

$$E = \sum_{i=1}^{M}(S_{meas_i} - f(P_{meas_i}, a_n, w_n, t_n))^2 \qquad \text{Equation 1:}$$

where Smeas and Pmeas represent the water saturation and capillary pressure data and an, wn, tn are the unknown parameters to solve.

In another embodiment, a second equation incorporates the solved, previously-unknown parameters (an, wn, tn) into a model defining a set N of hyperbolic tangents. For example, in one embodiment, the second equation corresponds to the following equation:

$$f(P, a_n, w_n, t_n) = a_1 + a_N + \sum_{n=1}^{N}(a_{n+1} - a_n)\cdot\tan h(w_n\cdot(P - t_n)) \qquad \text{Equation 2:}$$

with the constraints
$w_n > 0$, $\forall n \in [1, N]$ n, $N \in \mathbb{N}$
$a_{n+1} < a_n$, $\forall n \in [1, N-1]$ n, $N \in \mathbb{N}$
where P is the logarithmic transform of the normalized capillary pressure and N is the number of hyperbolic tangents set for the model.

Figure 6:
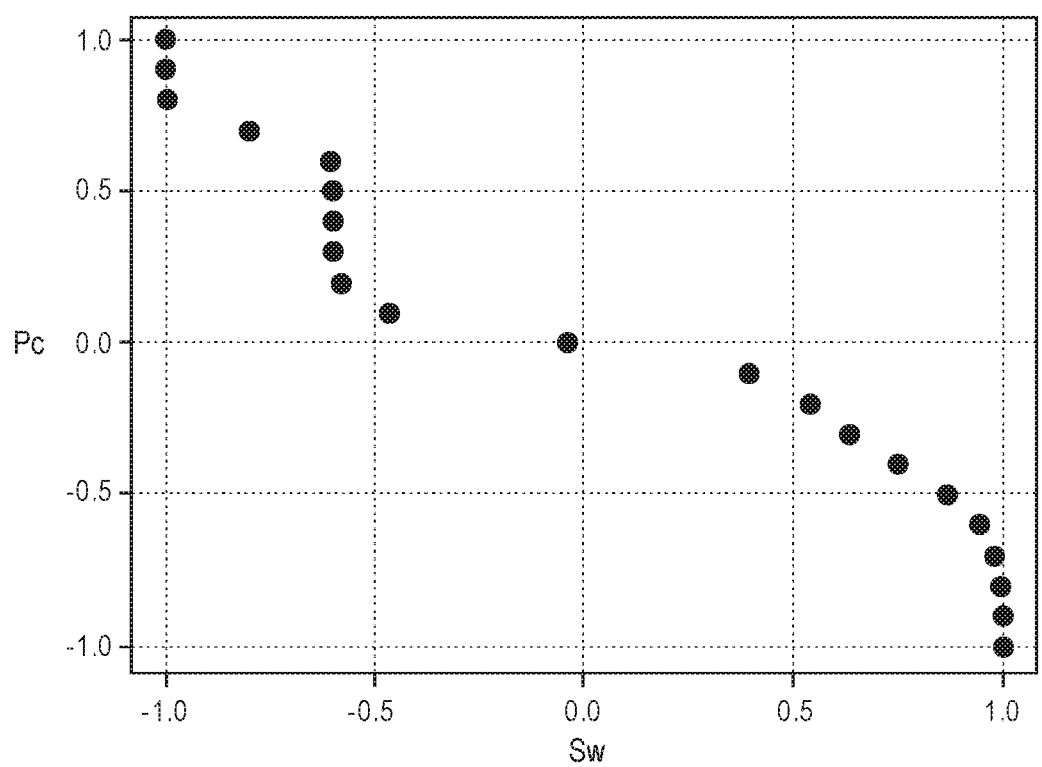
FIG. 6 illustrates capillary pressure data from a multi-pore throat system according to an embodiment.

In one embodiment, the number of hyperbolic tangents of the model in Equation 2 is predetermined. For example, FIG. 6 illustrates capillary pressure data from a 3-pore throat system, accordingly, Equations 1-2 would be set to N=3.

Figure 8:
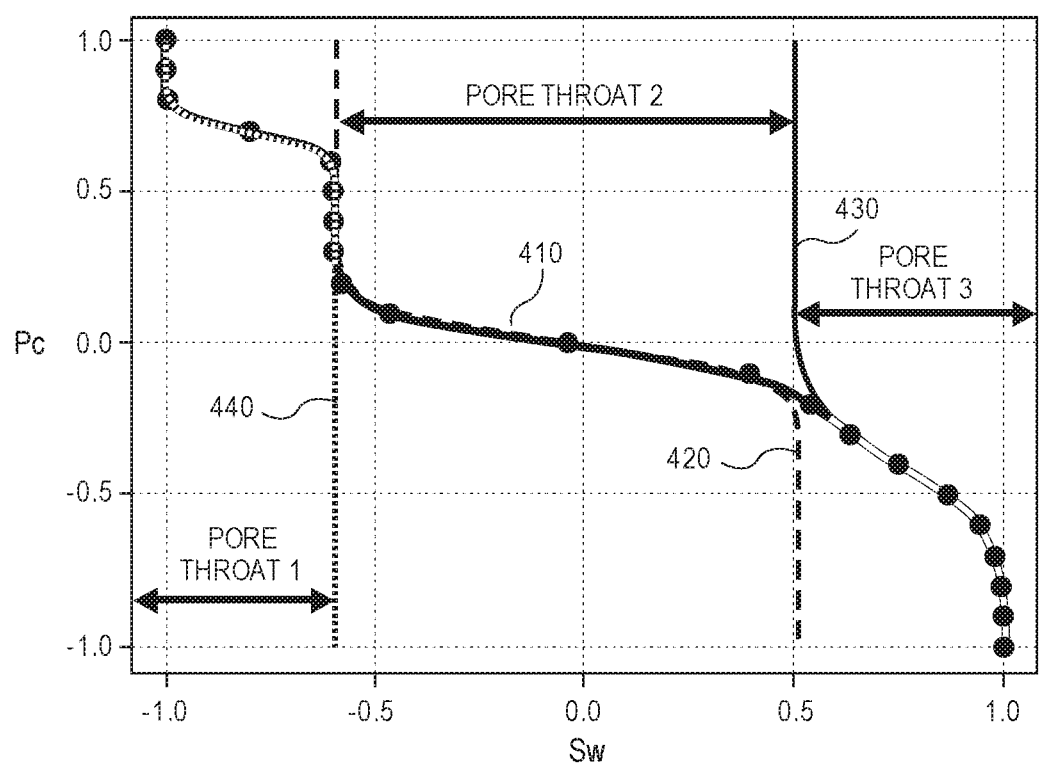
FIG. 8 illustrates hyperbolic tangents corresponding to pore throats according to an embodiment.

In one embodiment, the scaling factors $(a_{n+1} - a_n)$ of each hyperbolic tangent in the set N are linked together so that the sum of the hyperbolic tangents are bounded between 2a1 and 2aN. The linking may force the partition of the hyperbolic tangents among various pore throats. For example, forcing one hyperbolic tangent per pore throat instead of one hyperbolic tangent over 3 pore throat and two other hyperbolic tangents with no contribution. That is, as illustrated in FIG. 8, each hyperbolic tangent may be limited to one pore throat.

Figure 3:
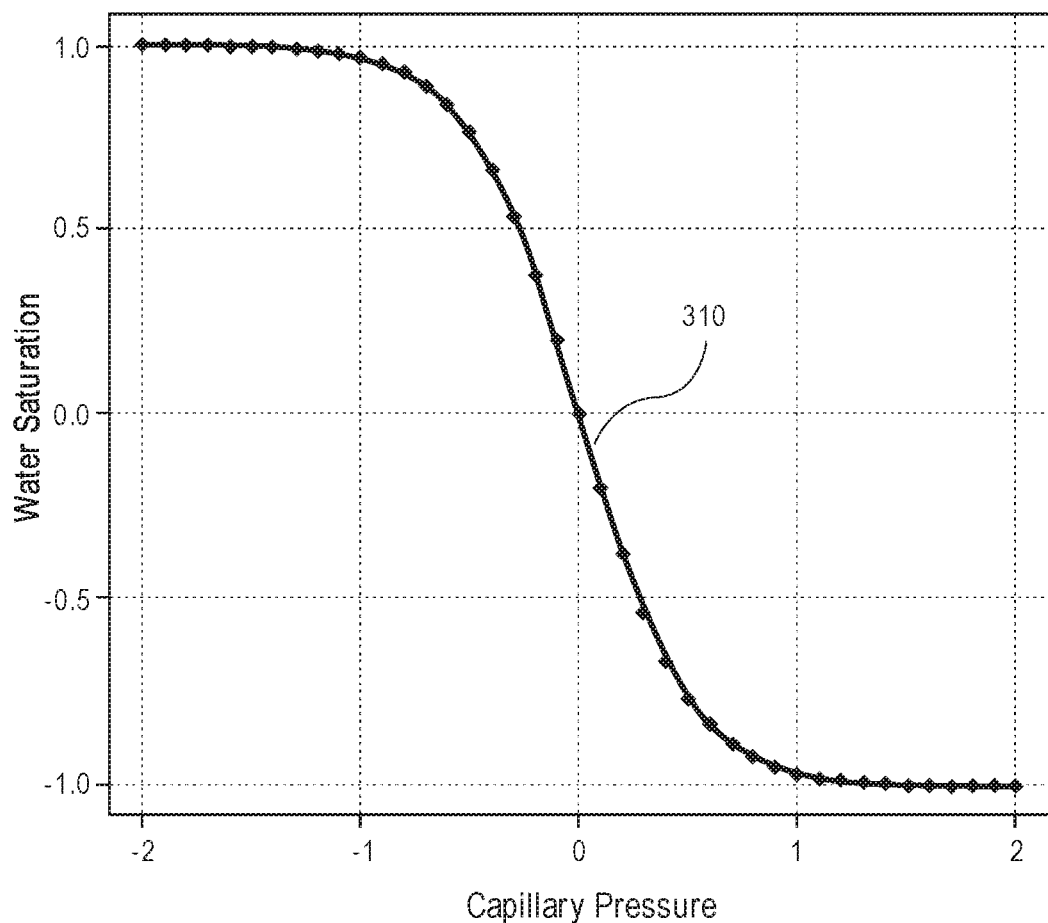
FIG. 3 illustrates a model of hyperbolic tangents in a capillary pressure and water saturation system according to an embodiment.
Figure 4:
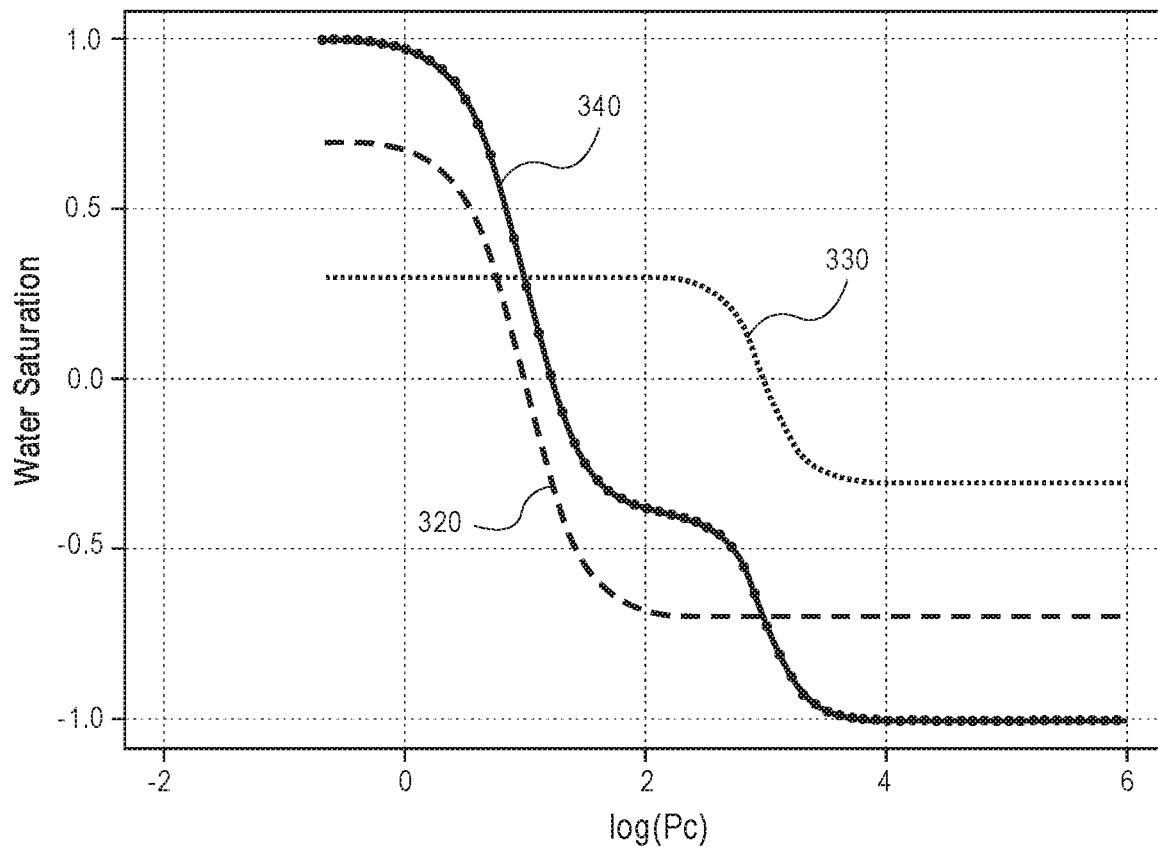
FIG. 4 illustrates a model of hyperbolic tangents in a capillary pressure and water saturation system according to an embodiment.
Figure 5:
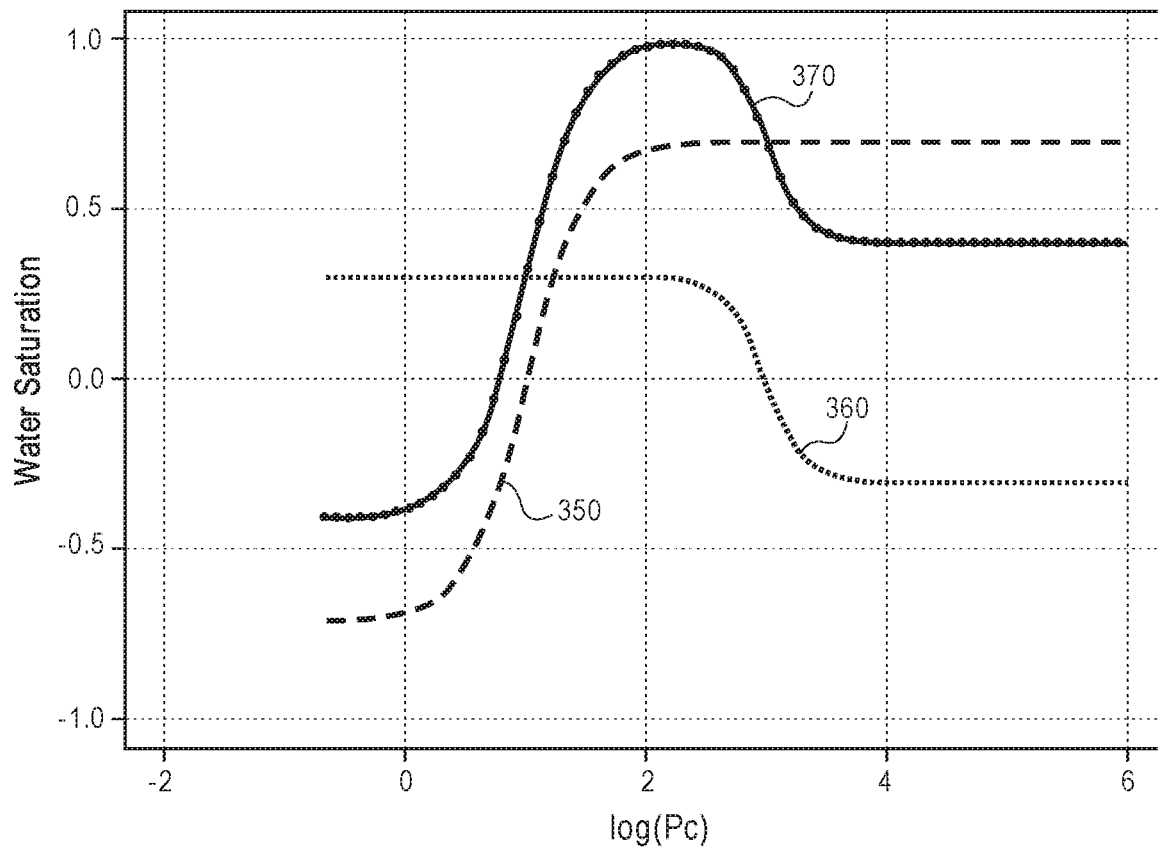
FIG. 5 illustrates a model of hyperbolic tangents in a capillary pressure and water saturation system according to an embodiment.

In one embodiment, the constraints present in Equation 2 are configured to limit the hyperbolic tangents to realistic capillary pressure curves and improves the stability of the model. For example, the hyperbolic tangents may be sorted by the number of pore throats in the system, with the "first" hyperbolic tangent starting on the left. Each pore throat and the corresponding combined hyperbolic tangent may be set as monotonous decreasing functions. For example, FIGS. 3, 4, and 5 illustrate a model of hyperbolic tangents in a capillary pressure and water saturation system according to an embodiment. FIG. 3 illustrates a single hyperbolic tangent 310 in a capillary pressure and water saturation system created using Equation 2 above with the constraints therein. The x-axis represents the capillary pressure and the y-axis represents the water-saturation. FIG. 4 illustrates two hyperbolic tangents 320 and 330 created using Equation 2 above with the constraints therein. As illustrated in FIG. 4, a third hyperbolic tangent 340 is the sum of hyperbolic tangents 320 and 330 and represents a dual pore throat system.

FIG. 5 illustrates two hyperbolic tangents 350 and 360 created without the constraints in Equation 2 above, and a third hyperbolic tangent 370 which is the sum of hyperbolic tangents 350 and 360. As illustrated in FIG. 5, the third hyperbolic tangent 370 may not represent a realistic capillary pressure curve because the underlying unconstrained hyperbolic tangents 350 and 360 go in different directions. A hyperbolic tangent may also not represent a realistic capillary pressure curve if it results in a non-monotonous decreasing function.

In one embodiment, a non-linear optimization routine is used to find the best-fit parameters. For example, a non-linear optimization routine configured to handle linear inequalities constraints, such as sequential quadratic programming, may be used to find the best-fit parameters.

Figure 7:
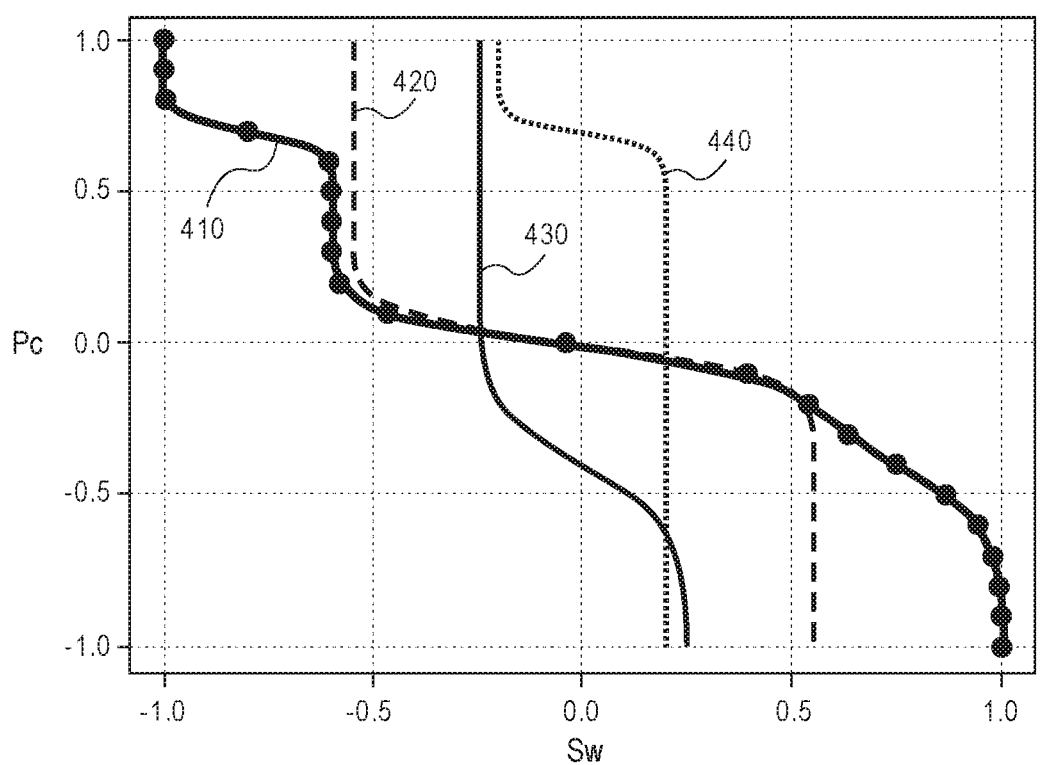
FIG. 7 illustrates a curve fit to capillary pressure data according to an embodiment.

FIGS. 6, 7, and 8 illustrate a capillary pressure model according to embodiments of this disclosure. FIG. 6 illustrates capillary pressure data from a multi-pore throat system. FIG. 7 illustrates a best-fit curve 410 over the capillary pressure data. As illustrated in FIG. 7, the best fit curve 410 is the sum of three hyperbolic tangents 420, 430, and 440. FIG. 8 illustrates the three hyperbolic tangents 420, 430, and 440 shifted show which hyperbolic tangent corresponds to with pore throat.

As illustrated in FIGS. 6-8, a capillary pressure model incorporating Equations 1 and 2 shows a good fit to the measured capillary pressure data wells, and a number of hyperbolic tangents N can be set to fit the number of pore throats in the system. In some embodiments, a good fit is determined by the amount of error in Equation 1: the least error on Equation 1 signifying the best fit, whereas a higher error value indicates a lower quality of the fit.

In one embodiment, a saturation height function is created by combining the capillary pressure model of Equations 1 and 2 together with equations incorporating other reservoir physical properties. For example, a capillary pressure model may be created using Equations 1 and 2 to fit measured capillary pressure data while simultaneously incorporating permeability data to create a saturation height function.

As described above, the capillary pressure model of Equations 1 and 2 may be subject to additional correction. Capillary pressure data obtained from core plug samples from the reservoir may be subject to conformance or closure effects depending on how the core plug is obtained. When a core plug is immersed in mercury for HPMI (High Pressure Mercury Injection), with pressures as high as, for example, about 60,000 psi, or MICP (Mercury Injection Capillary Pressure), with pressures below, for example, about 2,000 psi, the mercury injection first starts at a very low pressure. However, the core plug interface may have some edge roughness and/or other alterations that are not representative of the internal pore system of the reservoir. For example, the core plug interface may be more or less friable, or may have a roughness altered by the core plug cutting process as well as by handling, aging, and manipulation prior to the mercury injection experiments, resulting in the pores exposed on the interface of the core plug sample being larger than they were originally. As the mercury pressure increases, mercury will start to fit around the core plug, and will enter the damaged rough interface at some pressure depending of the extent of the damage to the core plug. For example, the more damage, the bigger the openings created, and the lower the pressure at which mercury will start to penetrate the plug. These damage pores may not be representative of the pore system of the reservoir and therefore must be corrected for.

As the term is used herein, "entry pressure" refers to the point on the capillary pressure curve at which mercury initially enters the sample under a mercury injection experiment. The entry pressure is sometimes also called displacement pressure, and can be a rock characteristic that is linked to the force needed in the reservoir to have oil above free water.

In one embodiment, a method may be used to automatically perform closure correction on capillary pressure curves using multiple linked hyperbolic tangents. Correction may be done by extrapolation for homogenous core plug samples, such as sandstone, or by normalization for heterogeneous core plug samples, such as vuggy carbonate without fractures. In addition, method 600 may also be used to determine the entry pressure corresponding to the capillary pressure curve.

Figure 9:
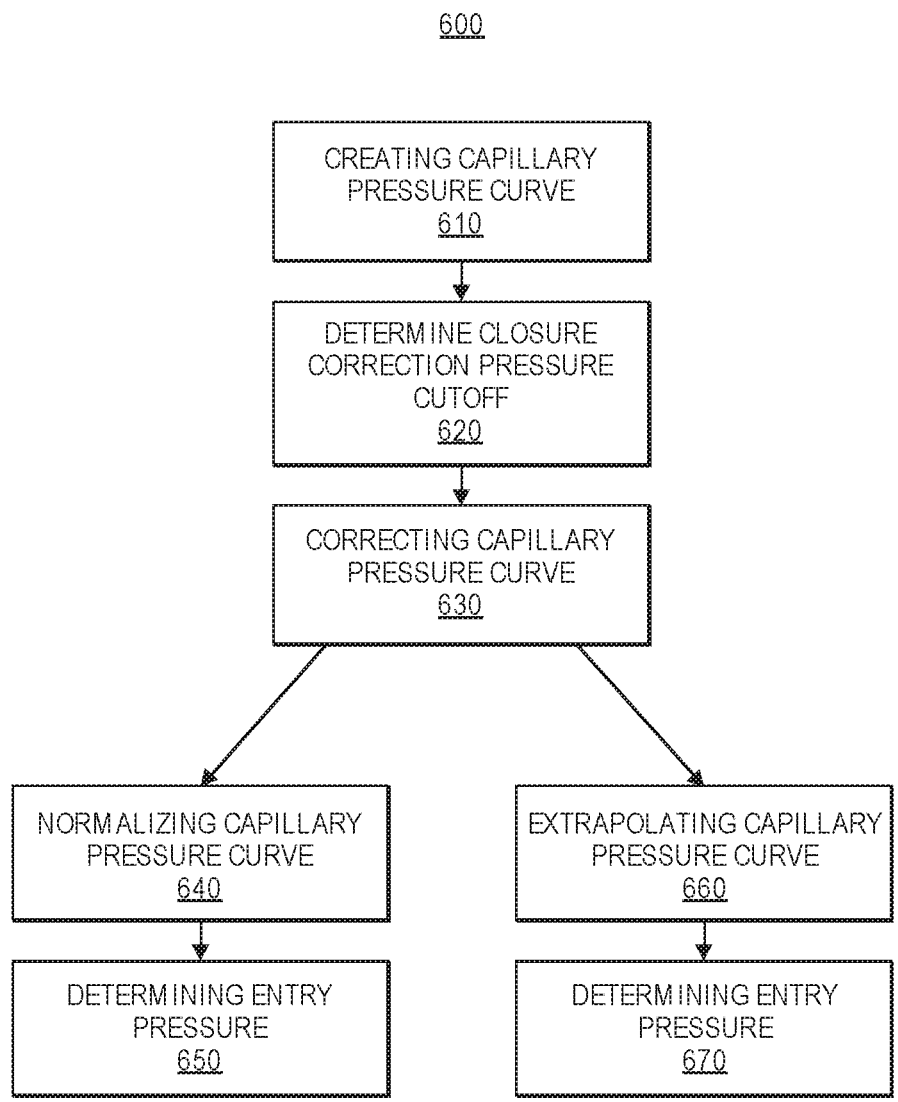
FIG. 9 illustrates a flowchart of a method for correcting a capillary pressure curve according to an embodiment.

FIG. 9 illustrates a flowchart of a method for correcting a capillary pressure curve and obtaining the entry pressure for the capillary curve. As illustrated in FIG. 9, a method 600 may begin with creating a capillary pressure curve in operation 610. Method 600 may then continue with determining a closure correction pressure cutoff in operation 620 and correcting the capillary pressure curve in operation 630. In one embodiment, the capillary pressure curve is corrected via normalization in operation 640 and the entry pressure is determined in operation 650. In another embodiment, the capillary pressure curve is corrected via extrapolation in operation 660 and the entry pressure is determined in operation 670.

Figure 10:
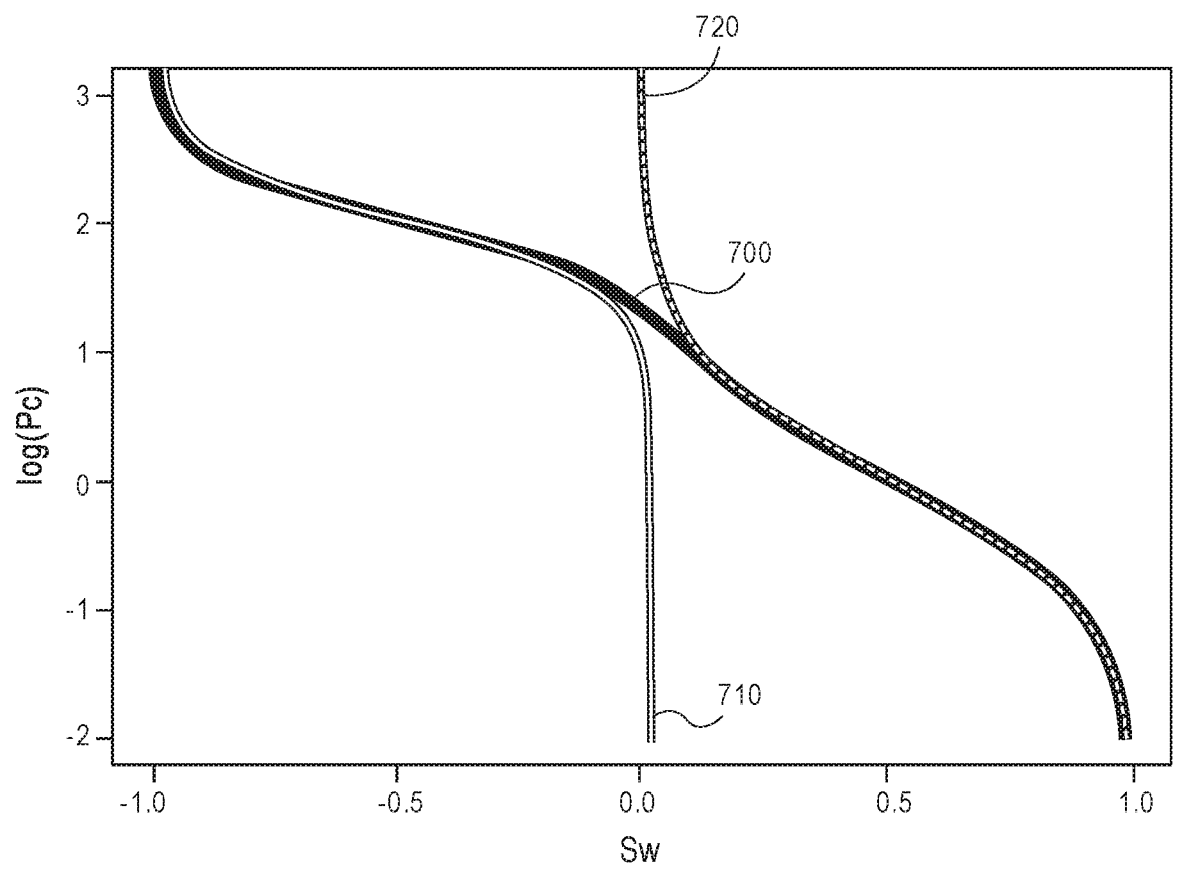
FIG. 10 illustrates a capillary pressure curve according to an embodiment.

FIG. 10 illustrates a capillary pressure curve with 2 pore throats. As illustrated in FIG. 10, in operation 610, a capillary pressure curve 700 is created by linking multiple hyperbolic tangents 710 and 720 using Equation 2 to fit the obtained capillary pressure data 750 as similarly described above with respect to FIGS. 2-8.

In operation 620, the closure correction pressure cutoff is determined. In one embodiment, the closure correction pressure cutoff corresponds to the local minimum of the second derivative of the capillary pressure curve where the capillary pressure is the lowest. For example, the capillary pressure curve 700 may be created using Equation 2: Equation 2:

$$f(P,a_n,w_n,t_n) = a_1 + a_N + \Sigma_{n=1}^{N}(a_{n+1}-a_n)\cdot\tan h(w_n\cdot(P-t_n))$$

wherein N=2 to represent a two pore throat system.

The second derivative of the capillary pressure curve 700 may then be computed using the following equation:

$$\frac{d^n}{dz^n}\tanh z = \frac{2^{n+1}\cdot e^{2z}}{(1+e^{2z})^{n+1}}\cdot\sum_{k=0}^{n-1}\binom{n}{k}\cdot(-1)^k\cdot e^{2kz} \qquad \text{Equation 5}$$

wherein $$\binom{n}{k}$$

is the eulerian number and n=2.

Figure 11:
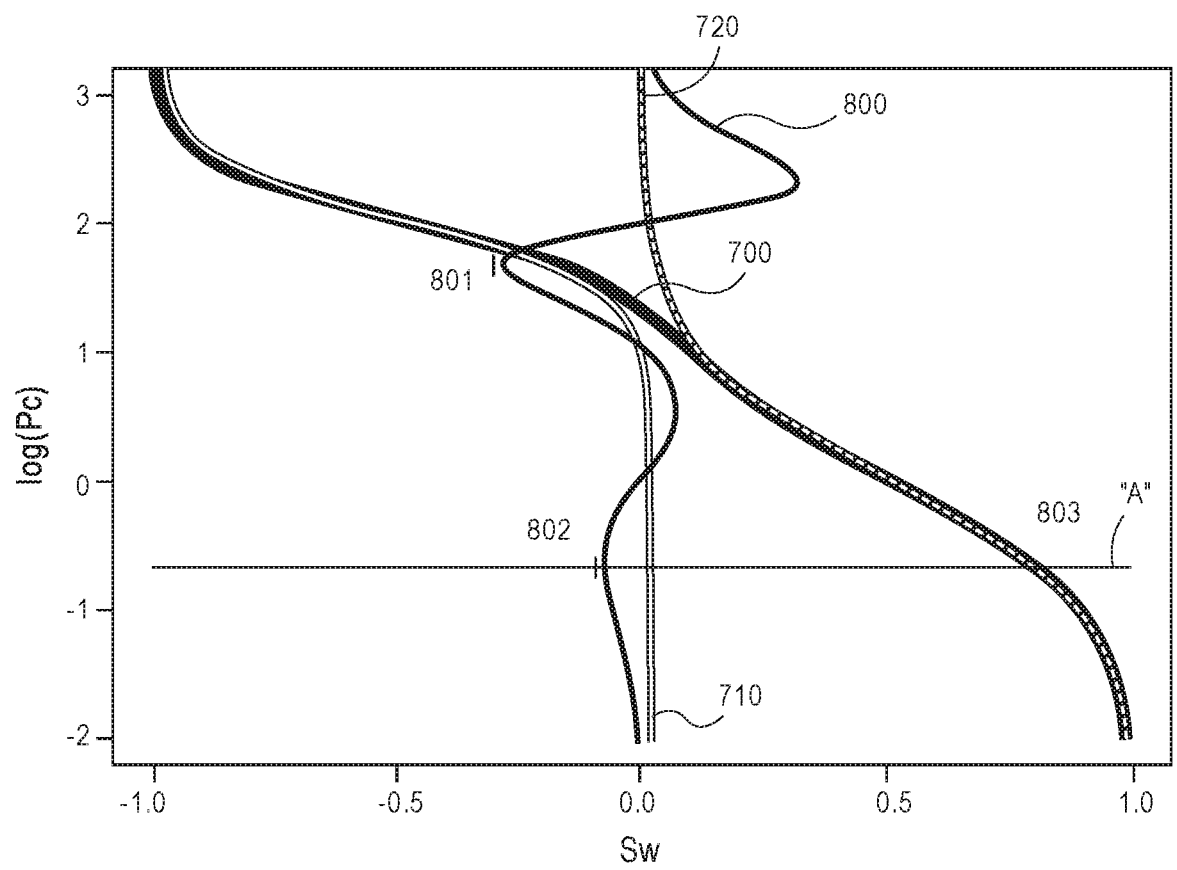
FIG. 11 illustrates a second derivative of a capillary pressure curve according to an embodiment.

FIG. 11 illustrates a second derivative 800 of the capillary pressure curve 700. As illustrated in FIG. 11, the second derivative has two local minima 801 and 802, with the pressure being lowest at the 802 local minima. Accordingly, the closure correction pressure cutoff 803 corresponds to the pressure at the local minima 802 along line "A."

Figure 12:
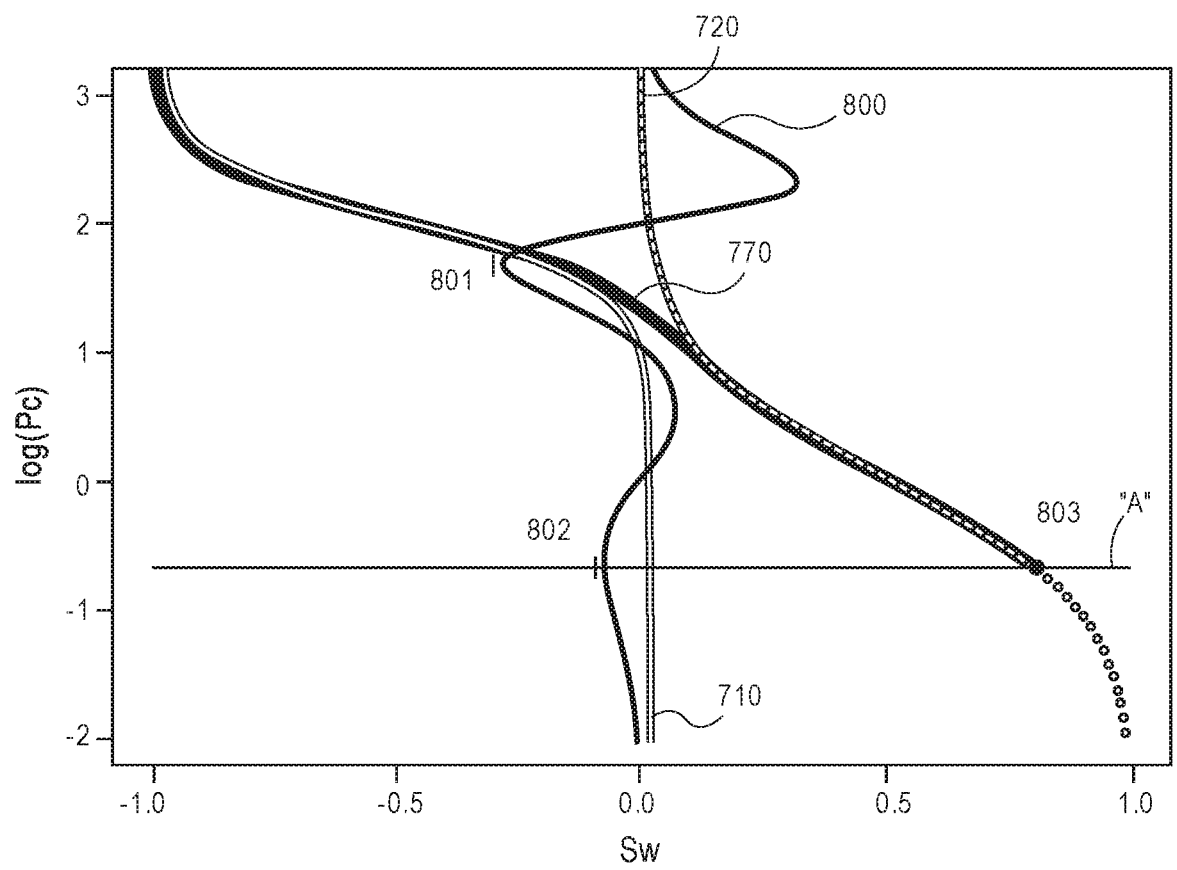
FIG. 12 illustrates a cropped capillary pressure curve according to an embodiment.

FIG. 12 illustrates a cropped capillary pressure curve 770. As illustrated in FIG. 12, all capillary pressure data lower than the closure correction pressure cutoff 803 is removed. As described above, the removed capillary pressure data may correspond to capillary data subject to conformance or closure effects.

Once the closure correction pressure cutoff 803 is determined, the capillary pressure curve 770 may be corrected and the entry pressure may be determined in operation 630.

The correction may be done by normalization in operation 640 or by extrapolation in operation 660.

In operations 640 and 650, the correction is done by normalization and the closure correction pressure cutoff corresponds to the entry pressure.

Figure 13:
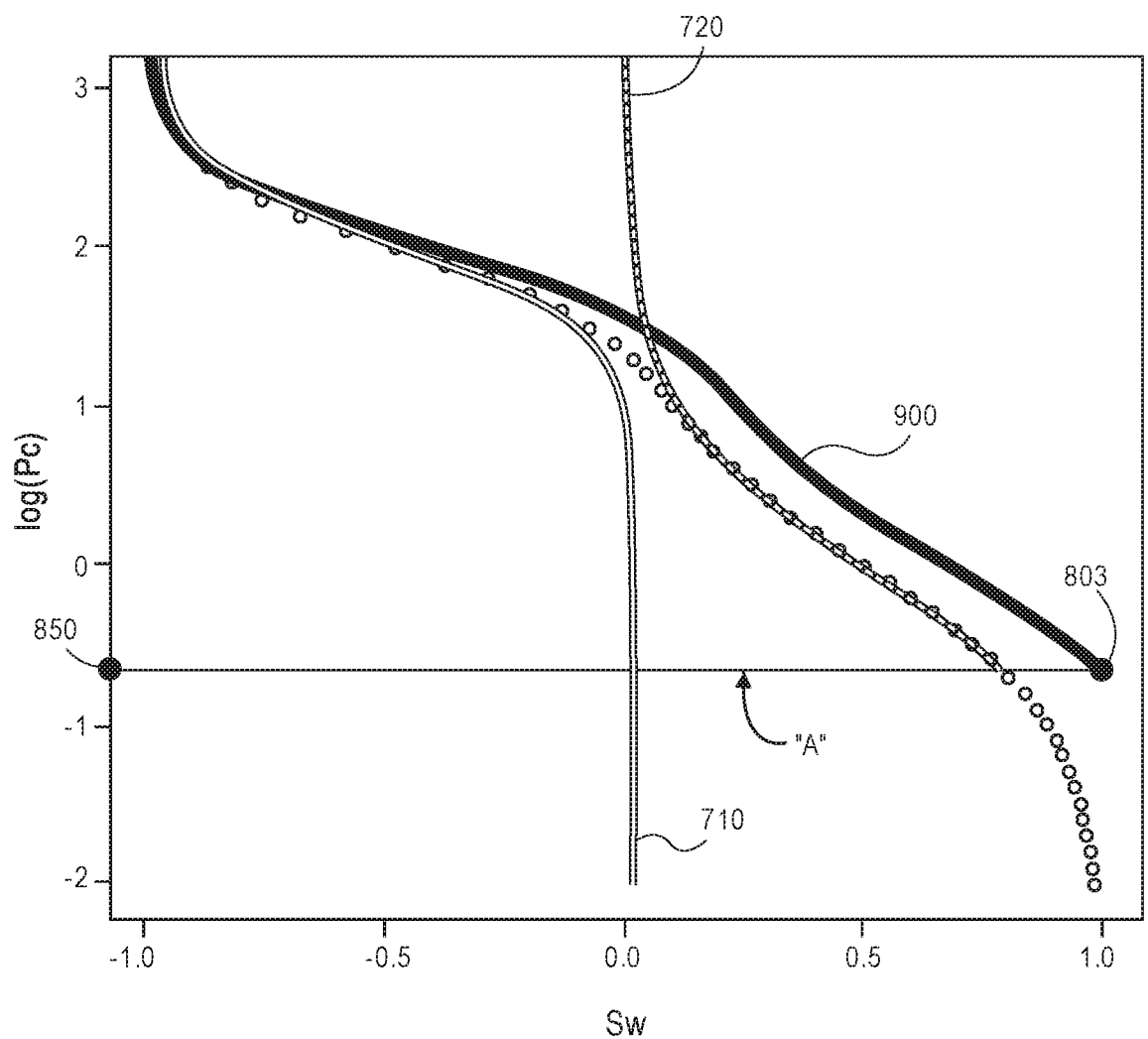
FIG. 13 illustrates a normalized capillary pressure curve according to an embodiment.

FIG. 13 illustrates a normalized capillary pressure curve. As illustrated in FIG. 13, a normalized capillary pressure curve 900 is created by normalizing the cropped capillary pressure curve 770 such that the closure correction pressure cutoff 803 corresponds to 100% wetting phase saturation in operation 640. The closure correction pressure cutoff 803 will correspond to the entry pressure 850 along line "A" in operation 650.

The normalization of cropped capillary pressure curve 770 may be done via normalization methods standard to the oil industry. For example, normalization may be done by taking the saturation value corresponding to the closure correction pressure cutoff 803 and dividing all the saturation of the capillary pressure by this value such that the last point of the normalized capillary pressure curve will be the saturation at the closure correction pressure cutoff 803 and/or the saturation at the closure correction pressure cutoff 803=1.

In operation 660, the correction is done by extrapolation using the closure correction pressure cutoff and a first derivative pressure cutoff and the entry pressure is the pressure at 100% wetting phase saturation.

In one embodiment, the first derivative pressure cutoff corresponds to the local minimum of the first derivative of the capillary pressure curve 700 where the capillary pressure is the lowest. For example, the first derivative of the capillary pressure curve 700 may be computed using the following equation:

$$\frac{df}{dP} = \sum_{n=1}^{N} (a_{n+1} - an) \cdot w_n \cdot (1 - \tanh(w_n \cdot (P - t_n)) \cdot \tanh(w_n \cdot (P - t_n))$$

Equation 6

Figure 14:
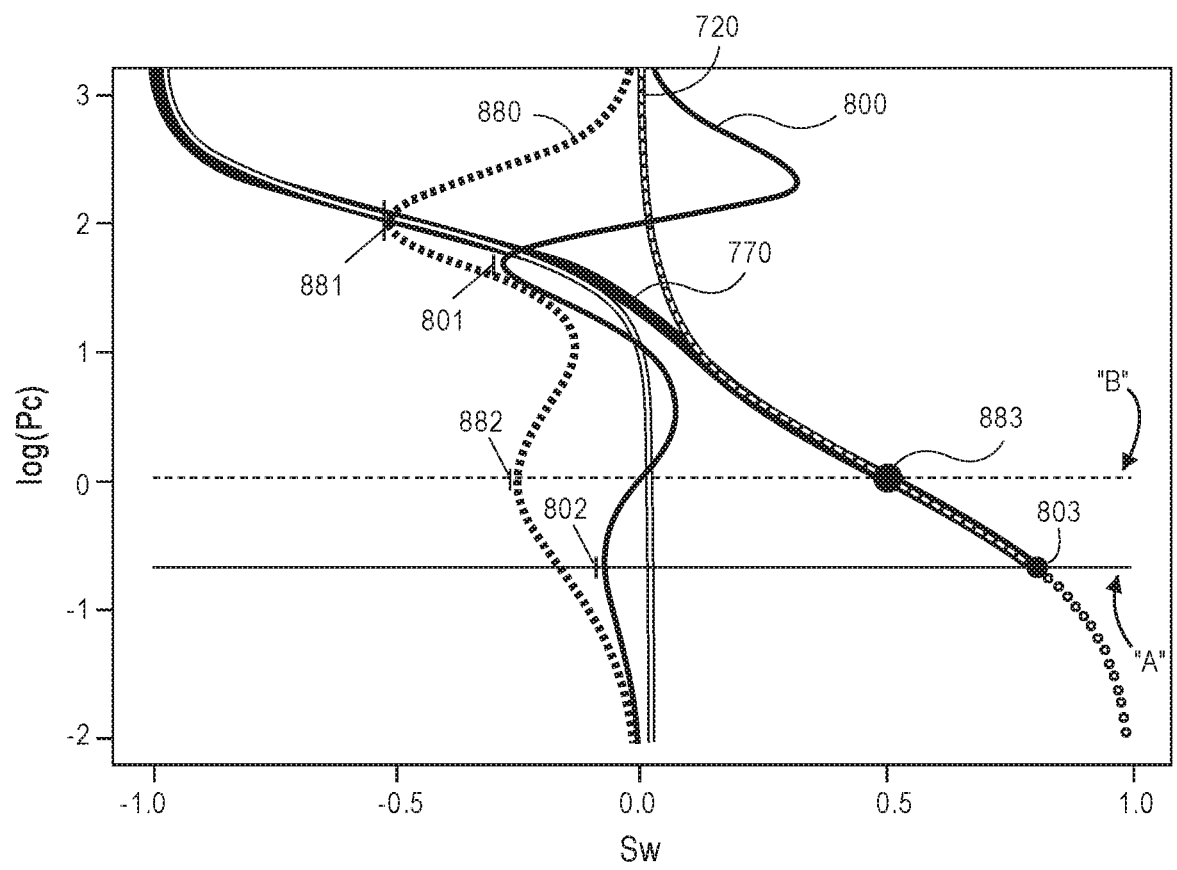
FIG. 14 illustrates a first derivative of a capillary pressure curve according to an embodiment.

FIG. 14 illustrates a first derivative 880 and the second derivative 800 of a cropped capillary pressure curve 770. As illustrated in FIG. 14, the first derivative has two local minima 881 and 882, with the pressure being lowest at the 882 local minima. Accordingly, the first derivative pressure cutoff 883 corresponds to the pressure at the local minima 882 along the line "B." As illustrated in FIG. 14, the closure correction pressure cutoff 803 corresponds to the local minima 802 of the second derivative 800, and the capillary pressure curve 770 is cropped to remove all capillary pressure data lower than the closure correction pressure cutoff 803.

Figure 15:
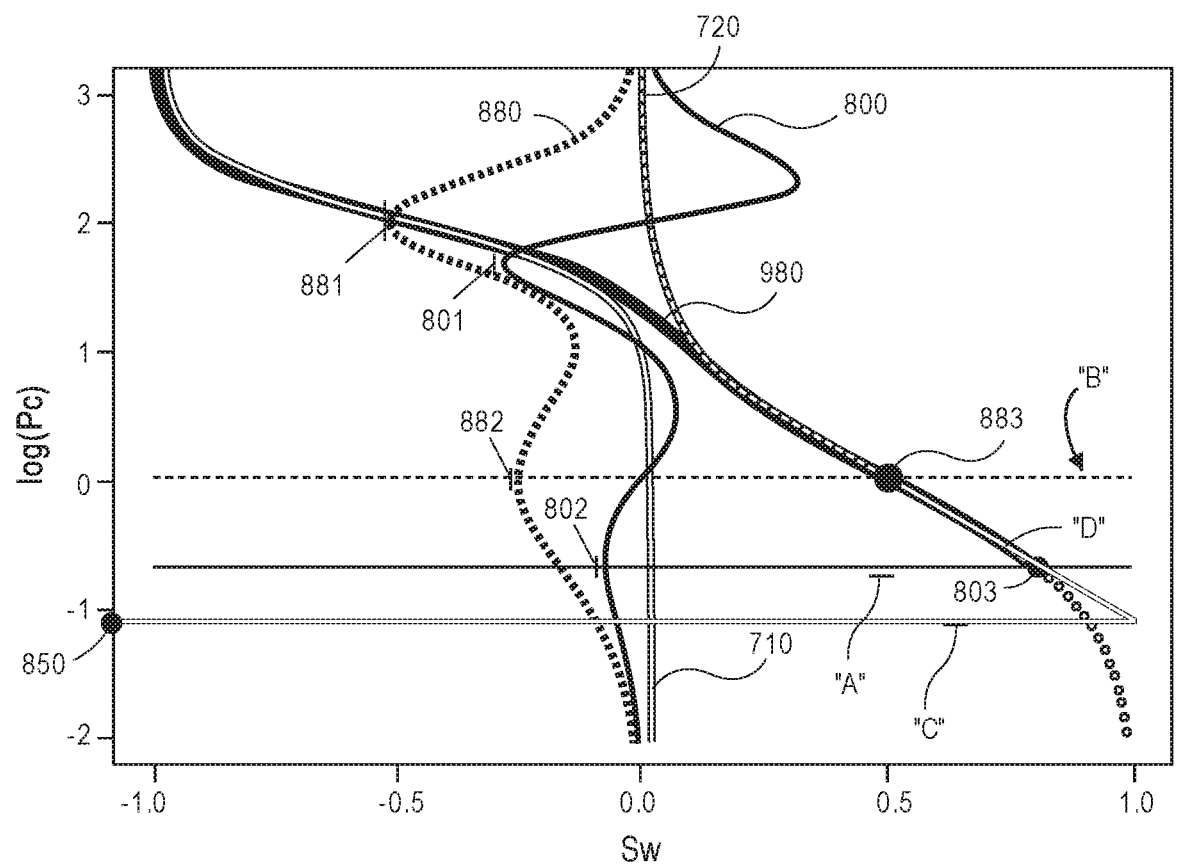
FIG. 15 illustrates an extrapolated capillary pressure curve according to an embodiment.

FIG. 15 illustrates an extrapolated capillary pressure curve. As illustrated in FIG. 15, an extrapolated capillary pressure curve 980 is created by regression analysis between the first derivative pressure cutoff 883 and the closure correction pressure cutoff 803. For example, as illustrated in FIG. 15, a least square linear regression between the first derivative pressure cutoff 883 and the closure correction pressure cutoff 803 may be computed in operation 660.

The least square linear regression may be used to predict the saturation below the closure correction pressure cutoff 803 until obtaining a wetting phase saturation of 100%. For example, the least square linear regression may be used to extrapolate the extrapolated capillary pressure curve 980 to the 100% wetting phase saturation point using a linear equation, see "D".

In operation 670, as illustrated in FIG. 15, the entry pressure 850 corresponds to a pressure at a wetting phase saturation of 100% along line "C."

Accordingly, in some embodiments, method 600 can automatically perform the closure correction and determine the entry pressure of capillary pressure data for homogenous and heterogeneous plug core samples using normalization or extrapolation analysis.

Figure 16:
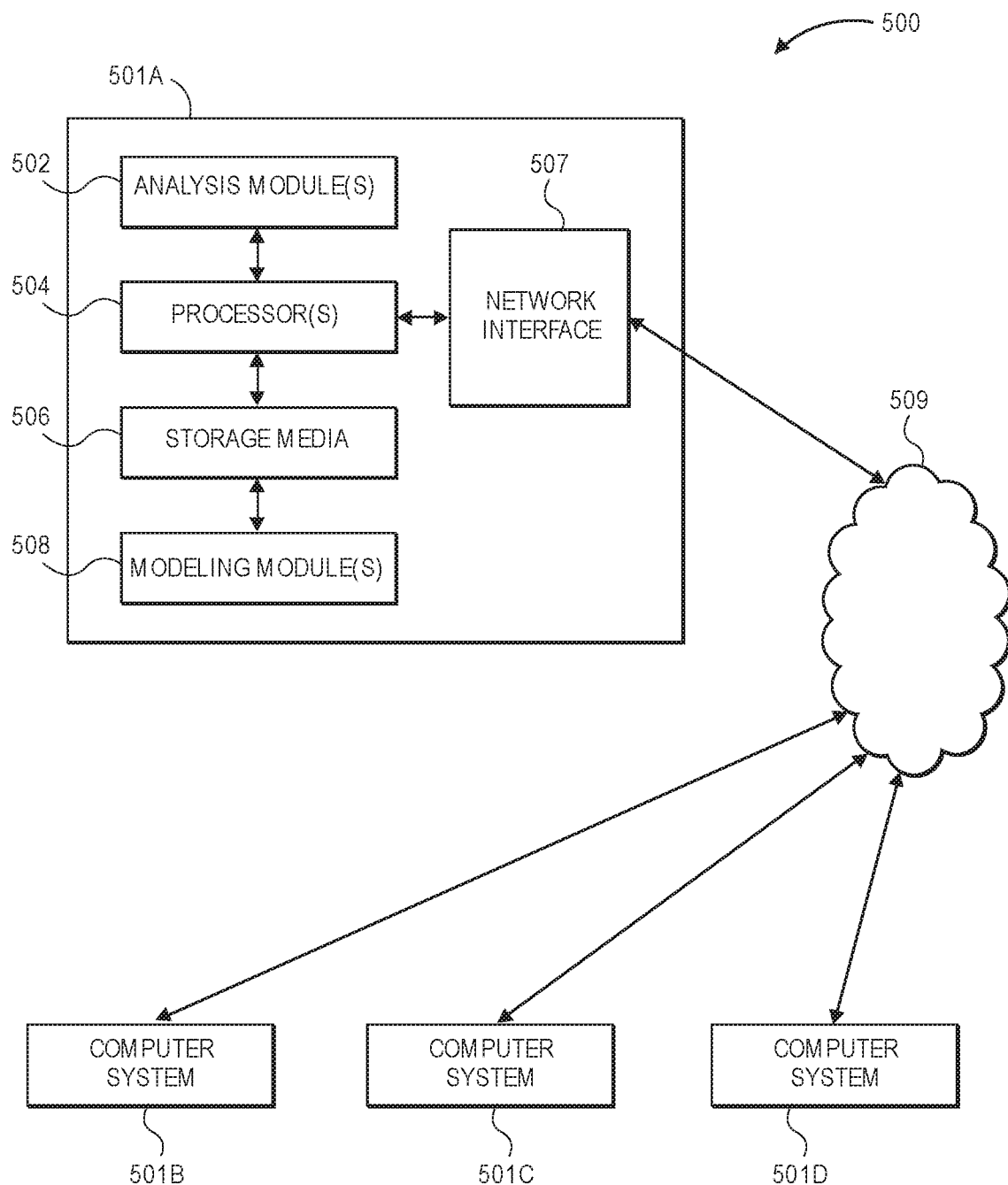
FIG. 16 illustrates a schematic view of a computing system according to an embodiment.

In some embodiments, the methods of the present disclosure may be executed by a computing system. FIG. 16 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 16 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more modeling module(s) 508. In the example of computing system 500, computer system 501A includes the modeling module 508. In some embodiments, a single modeling module may be used to perform at least some aspects of one or more embodiments of the methods disclosed herein. In alternate embodiments, a plurality of modeling modules may be used to perform at least some aspects of methods herein.

It should be appreciated that computing system 500 is one example of a computing system, and that computing system 500 may have more or fewer components than shown, may combine additional components not depicted in the example embodiment of FIG. 16, and/or computing system 500 may have a different configuration or arrangement of the components depicted in FIG. 16. The various components shown in FIG. 16 may be implemented in hardware, software, or a combination of both hardware and software, including one or more signal processing and/or application specific integrated circuits.

Further, aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 16), and/or through manual control by a user who may make determinations regarding whether a given step, action, template, model, or set of curves has become sufficiently accurate for the evaluation of the subsurface three-dimensional geologic formation under consideration.

The present disclosure has been described with reference to the embodiments. Although a few embodiments have been shown and described, it will be appreciated by those skilled in the art that changes may be made in these embodiments without departing from the principles and spirit of preceding detailed description. It is intended that the present disclosure be construed as including such modifications and alterations insofar as they come within the scope of the appended claims or the equivalents thereof.

What is claimed is:

1. A method for correcting a capillary pressure curve, comprising:
obtaining at least one of capillary pressure data representing capillary pressure in a reservoir or permeability data representing permeability in the reservoir, wherein the at least one of the capillary pressure data or permeability data is at least partially derived from a core sample;
creating a capillary pressure curve using multiple linked hyperbolic tangents and at least one of the obtained capillary pressure data and permeability data;
determining a closure correction pressure cutoff of the capillary pressure curve, wherein, at pressures below the closure correction pressure cutoff, saturation in the core sample is not representative of saturation in the reservoir;
correcting the capillary pressure curve based at least in part on the closure correction pressure cutoff, wherein the correcting of the capillary pressure curve comprises at least one of normalizing the capillary pressure curve and extrapolating the capillary pressure curve; and
generating an updated saturation model of a subterranean domain based in part on the capillary pressure curve after correcting the capillary pressure curve.

2. The method of claim 1, further comprising determining an entry pressure for the capillary pressure curve after correcting the capillary pressure curve.

3. The method of claim 1, wherein determining the closure correction pressure cutoff of the capillary pressure curve comprises determining one or more local minima of the second derivative of the capillary pressure curve, and wherein the closure correction pressure cutoff corresponds to the local minimum where the capillary pressure is the lowest.

4. The method of claim 2, wherein normalizing the capillary pressure curve comprises adjusting the closure correction pressure cutoff to correspond to a wetting phase saturation of 100%, and wherein the entry pressure corresponds to the closure correction pressure cutoff after adjusting the closure correction pressure cutoff.

5. The method of claim 2, wherein extrapolating the capillary pressure curve comprises:
determining a first derivative pressure cutoff;
performing regression analysis between the first derivative pressure cutoff and the closure correction pressure cutoff; and
extrapolating the capillary pressure curve to the 100% wetting phase saturation point,
wherein the first derivative pressure cutoff corresponds to the first derivative local minima where the capillary pressure is the lowest, and
wherein the entry pressure corresponds to a pressure at the 100% wetting phase saturation point.

6. The method of claim 1, wherein correcting the capillary pressure curve comprises cropping the capillary pressure curve to eliminate the capillary pressure data below the closure correction pressure cutoff.

7. The method of claim 1, wherein the capillary pressure curve is defined by the following equation:

$$f(P,a_n,w_n,t_n)=a_1+a_N+\Sigma_{n=1}^{N}(a_{n+1}-a_n)\cdot \tan h(w_n\cdot(P-t_n))$$

with constraints:
$w_n>0$, $\forall n\in[1, N]$ n, $N\in \mathbb{N}$
$a_{n+1}<a_n$, $\forall n\in[1, N-1]$ n, $N\in \mathbb{N}$
where P represents a logarithmic transform of a normalized capillary pressure and N represents the number of hyperbolic tangents.

8. The method of claim 1, further comprising displaying the updated saturation model.

9. The method of claim 1, further comprising:
generating an initial saturation model before correcting the capillary pressure curve; and
displaying a difference between the initial saturation model and the updated saturation model.

10. A non-transitory computer-readable medium staling instructions that, when executed by one or more processors of a computing system, cause the computing system to perform operations, the operations comprising:
obtaining at least one of capillary pressure data representing capillary pressure in a reservoir or permeability data representing permeability in the reservoir, wherein the at least one of the capillary pressure data or permeability data is at least partially derived from a core sample;
creating a capillary pressure curve using multiple linked hyperbolic tangents and at least one of the obtained capillary pressure data and permeability data;
determining a closure correction pressure cutoff of the capillary pressure curve, wherein, at pressures below the closure correction pressure cutoff, saturation in the core sample is not representative of saturation in the reservoir;

correcting the capillary pressure curve based at least in part on the closure correction pressure cutoff;

determining an entry pressure for the capillary pressure curve after correcting the capillary pressure curve, wherein the correcting of the capillary pressure curve comprises at least one of normalizing the capillary pressure curve and extrapolating the capillary pressure curve; and generating an updated saturation model of a subterranean domain based in part on the capillary pressure curve after correcting the capillary pressure curve.

11. The non-transitory computer-readable medium of claim 10, wherein determining the closure correction pressure cutoff of the capillary pressure curve comprises determining one or more local minima of the second derivative of the capillary pressure curve, wherein the closure correction pressure cutoff corresponds to the local minimum where the capillary pressure is the lowest, and wherein correcting the capillary pressure curve comprises cropping the capillary pressure curve to eliminate the capillary pressure data below the closure correction pressure cutoff.

12. The non-transitory computer-readable medium of claim 11, wherein normalizing the capillary pressure curve comprises adjusting the closure correction pressure cutoff to correspond to a wetting phase saturation of 100%, and wherein the entry pressure corresponds to the closure correction pressure cutoff after adjusting the closure correction pressure cutoff.

13. The non-transitory computer-readable medium of claim 11, wherein extrapolating the capillary pressure curve comprises:

determining a first derivative pressure cutoff;

performing regression analysis between the first derivative pressure cutoff and the closure correction pressure cutoff; and extrapolating the capillary pressure curve to the 100% wetting phase saturation point, wherein the first derivative pressure cutoff corresponds to the first derivative local minima where the capillary pressure is the lowest, and wherein the entry pressure corresponds to a pressure at the 100% wetting phase saturation point.

14. The non-transitory computer-readable medium of claim 10, wherein the capillary pressure curve is defined by the following equation:

$$f(P, a_n, w_n, t_n) = a_1 + a_N + \Sum_{n=1}^{N}(a_{n+1} - a_n) \cdot \tan h(w_n \cdot (P - t_n))$$

with constraints:

$w_n > 0$, $\forall n \in [1, N]$ n, $N \in \mathbb{N}$ $a_{n+1} < a_n$, $\forall n \in [1, N-1]$ n, $N \in \mathbb{N}$ where P represents a logarithmic transform of a normalized capillary pressure and N represents the number of hyperbolic tangents.

15. A computing system, comprising:

one or more processors; and a memory system comprising one or more non-transitory computer-readable media storing instructions that, when executed by one or more processors of a computing system, cause the computing system to perform operations, the operations comprising:

obtaining at least one of capillary pressure data representing capillary pressure in a reservoir or permeability data representing permeability in the reservoir, wherein the at least one of the capillary pressure data or permeability data is at least partially derived from a core sample;

creating a capillary pressure curve using multiple linked hyperbolic tangents and at least one of the obtained capillary pressure data and permeability data;

determining a closure correction pressure cutoff of the capillary pressure curve wherein, at pressures below the closure correction pressure cutoff, saturation in the core sample is not representative of saturation in the reservoir;

correcting the capillary pressure curve based at least in part on the closure correction pressure cutoff;

determining an entry pressure for the capillary pressure curve after correcting the capillary pressure curve, wherein the correcting of the capillary pressure curve comprises at least one of normalizing the capillary pressure curve and extrapolating the capillary pressure curve; and generating an updated saturation model of a subterranean domain based in part on the capillary pressure curve after correcting the capillary pressure curve.

16. The computing system of claim 15, wherein determining the closure correction pressure cutoff of the capillary pressure curve comprises determining one or more local minima of the second derivative of the capillary pressure curve, wherein the closure correction pressure cutoff corresponds to the local minimum where the capillary pressure is the lowest, and wherein correcting the capillary pressure curve comprises cropping the capillary pressure curve to eliminate the capillary pressure data below the closure correction pressure cutoff.

17. The computing system of claim 16, wherein normalizing the capillary pressure curve comprises adjusting the closure correction pressure cutoff to correspond to a wetting phase saturation of 100%, and wherein the entry pressure corresponds to the closure correction pressure cutoff after adjusting the closure correction pressure cutoff.

18. The computing system of claim 16, wherein extrapolating the capillary pressure curve comprises:

determining a first derivative pressure cutoff;

performing regression analysis between the first derivative pressure cutoff and the closure correction pressure cutoff; and extrapolating the capillary pressure curve to the 100% wetting phase saturation point, wherein the first derivative pressure cutoff corresponds to the first derivative local minima where the capillary pressure is the lowest, and wherein the entry pressure corresponds to a pressure at the 100% wetting phase saturation point.

19. The computing system of claim 15, wherein the capillary pressure curve is defined by the following equation:

$$f(P, a_n, w_n, t_n) = a_1 + a_N + \Sum_{n=1}^{N}(a_{n+1} - a_n) \cdot \tan h(w_n \cdot (P - t_n))$$

with constraints:

$w_n > 0$, $\forall n \in [1, N]$ n, $N \in \mathbb{N}$ $a_{n+1} < a_n$, $\forall n \in [1, N-1]$ n, $N \in \mathbb{N}$ where P represents a logarithmic transform of a normalized capillary pressure and N represents the number of hyperbolic tangents.

* * * * *